(12) United States Patent
Matsuoka

(10) Patent No.: US 9,148,525 B2
(45) Date of Patent: Sep. 29, 2015

(54) IMAGE TESTING APPARATUS, IMAGE FORMING APPARATUS AND COMPUTER READABLE INFORMATION RECORDING MEDIUM

(75) Inventor: Taira Matsuoka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 195 days.

(21) Appl. No.: 13/356,058

(22) Filed: Jan. 23, 2012

(65) Prior Publication Data

US 2012/0194847 A1  Aug. 2, 2012

(30) Foreign Application Priority Data

Jan. 27, 2011  (JP) ................................ 2011-015752
Jan. 16, 2012  (JP) ................................ 2012-006494

(51) Int. Cl.
| | |
|---|---|
| *G06K 15/00* | (2006.01) |
| *H04N 1/00* | (2006.01) |
| *G06K 9/32* | (2006.01) |
| *H04N 1/60* | (2006.01) |
| *H04N 1/333* | (2006.01) |
| *G06K 9/00* | (2006.01) |
| *G06K 9/68* | (2006.01) |

(52) U.S. Cl.
CPC .......... *H04N 1/00015* (2013.01); *G06K 9/3233* (2013.01); *H04N 1/00005* (2013.01); *H04N 1/00031* (2013.01); *H04N 1/00053* (2013.01); *H04N 1/00058* (2013.01); *H04N 1/33315* (2013.01); *H04N 1/603* (2013.01); *H04N 2201/0094* (2013.01)

(58) Field of Classification Search
USPC ....................................................... 358/1.14
See application file for complete search history.

(56) References Cited

U.S. PATENT DOCUMENTS

| | | | |
|---|---|---|---|
| 2003/0117513 A1* | 6/2003 | Anderson | 348/333.11 |
| 2005/0206927 A1* | 9/2005 | Yamada | 358/1.9 |
| 2010/0188714 A1* | 7/2010 | Yamakawa | 358/504 |
| 2011/0122456 A1* | 5/2011 | Ishii et al. | 358/448 |

FOREIGN PATENT DOCUMENTS

| | | |
|---|---|---|
| JP | 2008-236638 A | 10/2008 |
| JP | 2008-272980 A | 11/2008 |
| JP | 4407588 B2 | 2/2010 |

OTHER PUBLICATIONS

English language abstract for Patent Publication No. JP-2007-033247 corresponds to JP-4407588.

* cited by examiner

*Primary Examiner* — Ashish K Thomas
*Assistant Examiner* — Neil R McLean
(74) *Attorney, Agent, or Firm* — Harness, Dickey & Pierce, P.L.C.

(57) ABSTRACT

An image testing apparatus compares output image data of an image which has been output onto a recording medium and original image data which has been read from an original and is used to output the image onto the recording medium, and determines an output state of the image. The image testing apparatus includes an output mode obtaining part configured to obtain an output mode designated by a user; a testing item setting part configured to set, according to the output mode obtained by the output mode obtaining part, an item for which the output state of the image is changed, as a testing item; and a testing part configured to test the output state of the image for the testing item which is set by the testing item setting part.

20 Claims, 10 Drawing Sheets

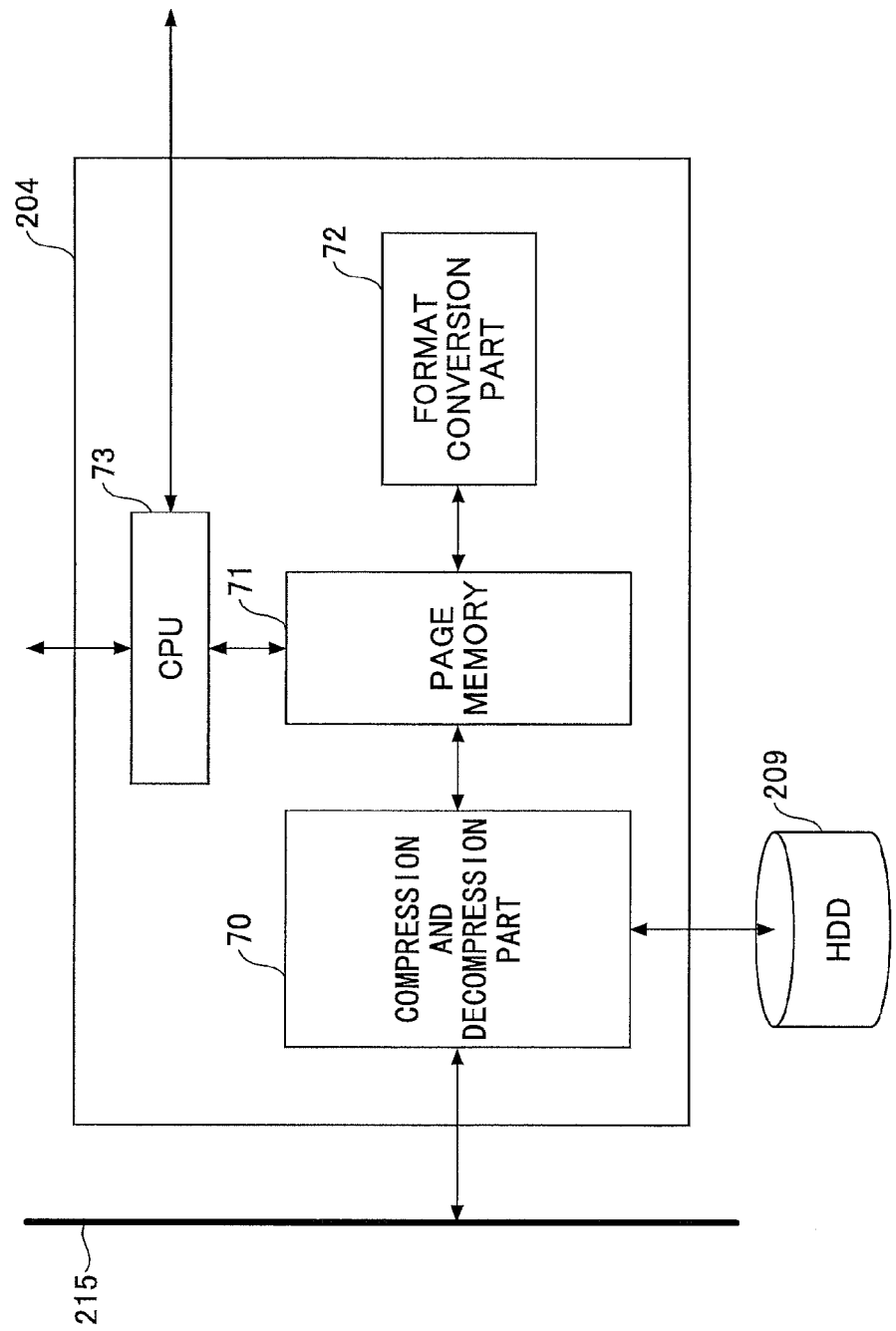

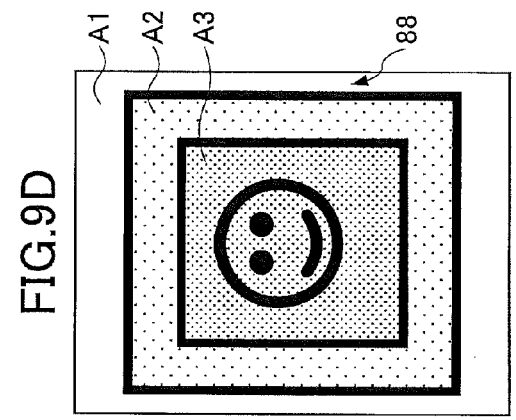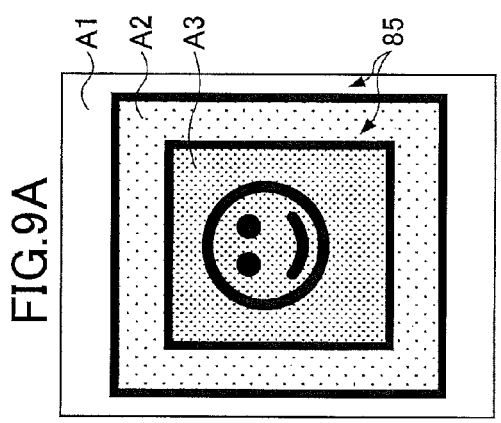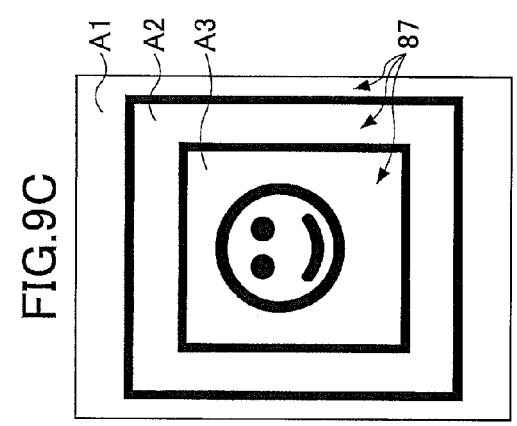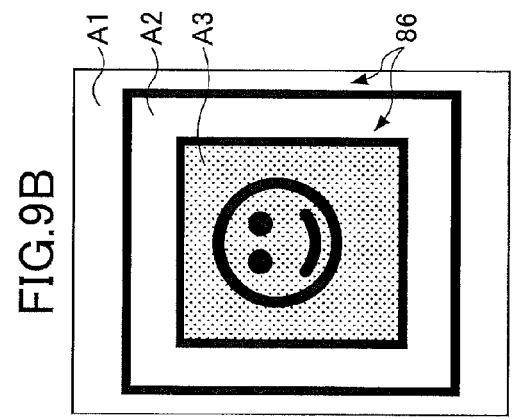

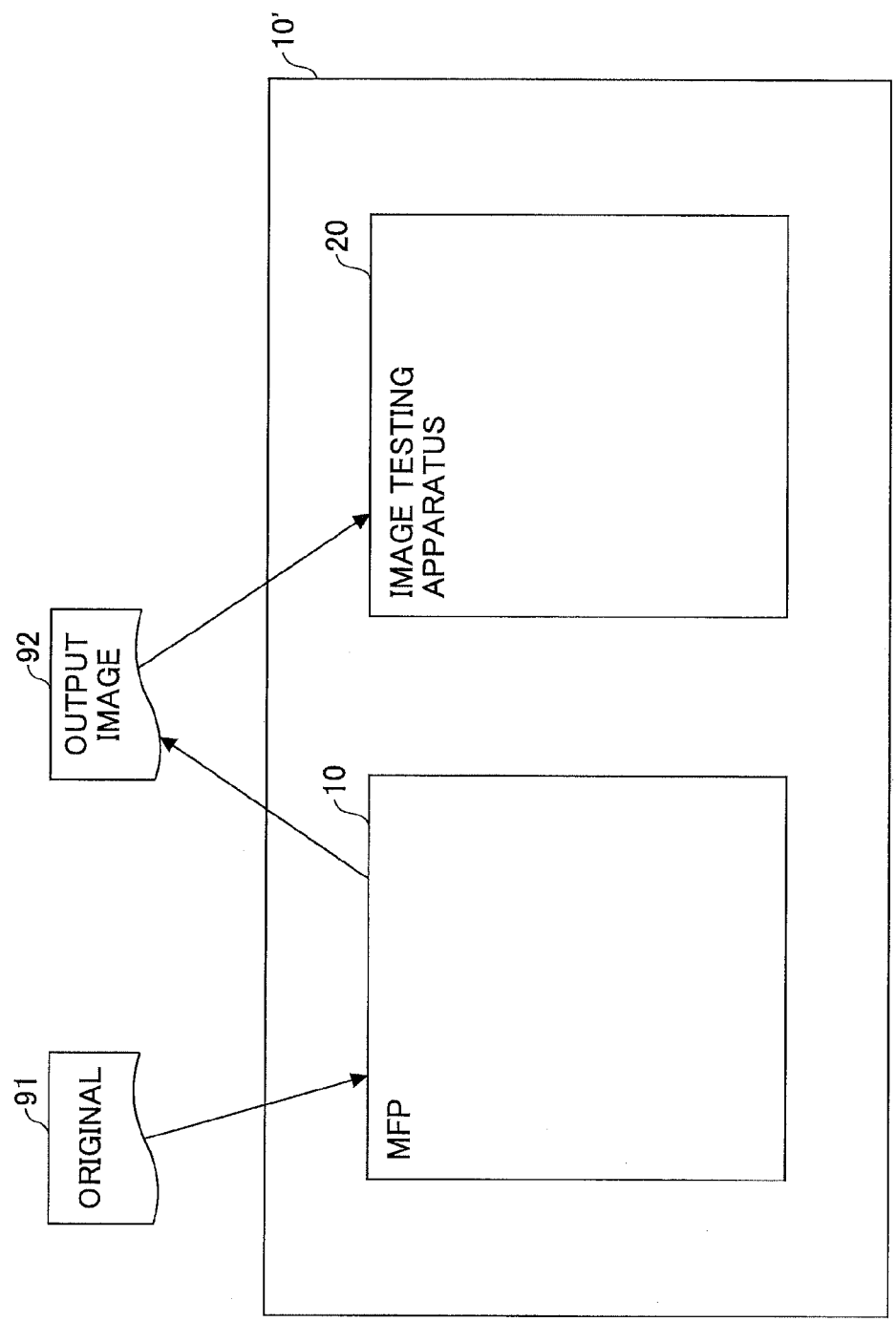

IMAGE TESTING APPARATUS, IMAGE FORMING APPARATUS AND COMPUTER READABLE INFORMATION RECORDING MEDIUM

BACKGROUND OF THE INVENTION

1. Field of the Invention

The present invention relates to an image testing apparatus, an image forming apparatus and a computer readable information recording medium.

2. Description of the Related Art

In a printing machine such as an offset printing machine, there may be a case where an output (printed) page obtained from an original has an image in a state different from a request of a user because of a defect such as a change in density, a void in the image, a spot stain or such, occurring at a time of printing. In the related art, a testing apparatus is known which is used to determine whether an original image is closely reproduced in an output page.

Further, an image testing apparatus and an image forming apparatus are known in which according to a test resulting of the above-mentioned testing apparatus, a destination to which original image data will be conveyed is changed or the image is corrected. Further, for example, also in a copier or such, the testing apparatus is used to change a destination to which the original image data will be conveyed, correct the image, or the like. For example, a copier of an ink jet type is known in which read data of an original and read data of a copied original are compared, and a color in the copied original is corrected (see Japanese Laid-Open Patent Application No. 2008-272980 (Patent Document 1)).

Further, a testing apparatus for a printing machine is known which determines based on a master image whether a to-be-tested target which is an output (printed) page is satisfactory (see Japanese Patent No. 4407588 (Patent Document 2)).

SUMMARY OF THE INVENTION

According to an embodiment of the present invention, an image testing apparatus tests an output state of an image by comparing output image data of an image that has been output onto a printing medium and original image data which has been read from an original and is used to output the image onto the printing medium. The image testing apparatus includes an output mode obtaining part configured to obtain an output mode designated by a user; a testing item setting part configured to set, according to the output mode obtained by the output mode obtaining part, an item for which the output state of the image is changed, as a testing item; and a testing part configured to test the output state of the image for the testing item which is set by the testing item setting part.

Other objects, features and advantages of the present invention will become more apparent from the following detailed description when read in conjunction with the accompanying drawings.

BRIEF DESCRIPTION OF THE DRAWINGS

FIG. 6 is a block diagram of a controller included in an image testing apparatus shown in FIG. 1;

FIGS. 9A, 9B, 9C and 9D show image testing targets in a case where a background removal amount changing mode is carried out; and FIG. 10 shows a block diagram of an image forming apparatus according to a variant example of the first embodiment.

DETAILED DESCRIPTION OF THE PREFERRED EMBODIMENTS

According to the methods of the above-mentioned Patent Documents 1 and 2, it is determined whether an original image is closely reproduced in an output page. That is, in the test according to the above-mentioned Patent Documents 1 and 2, RGB data is compared between read data (original image data) of an original obtained from reading the original by a scanner or such and read data (output image data) obtained from reading an image of an output page. Then, it is determined that an abnormality has occurred in a case where RGB balance thus obtained is equal to or greater than a threshold.

However, there may be a case where not only it is requested to determine whether original image data is closely reproduced for an output page but also it is requested to determine whether the original image data is changed according to a user's request. That is, a user may request to carry out editing (i.e., the user does not request an output page which is close to an original) to obtain an image different from an image of the original, and for this purpose, may select a specific output mode.

For example, a user may select "color conversion mode" to change "red" into "blue", or select to increase sharpness (sharp filter), a smoothing process (soft filter) or the like. In such a case, a difference between an image of an original and an image of an output page may be increased, and a suitable testing result may not be obtained when an evaluation criterion mentioned above of whether the original image data is closely reproduced for the output page is used. That is, in a case where an original image is changed according to a user's request and an output page is obtained, a testing result of the output page being not close to the original may be obtained, and it may not be possible to determine whether the image of the original image data has been output in a state changed according to the user's request.

Embodiments of the present invention have been devised to solve the problem in the related art, and an object of the embodiments of the present invention is to provide an image testing apparatus, an image forming apparatus and a computer readable information recording medium, by which it is determined whether an output page is one having been changed according to an output mode requested by a user.

According to the embodiments of the present invention, for example, an item for which an output state of an image is changed according to an output mode designated by a user is set as a testing item; the output state is tested for the testing item that has been set, and it is determined whether the output page is one having been changed properly.

Below, the embodiments of the present invention will be described in detail.

<Image Testing System: Block Configuration>

Figure 1:
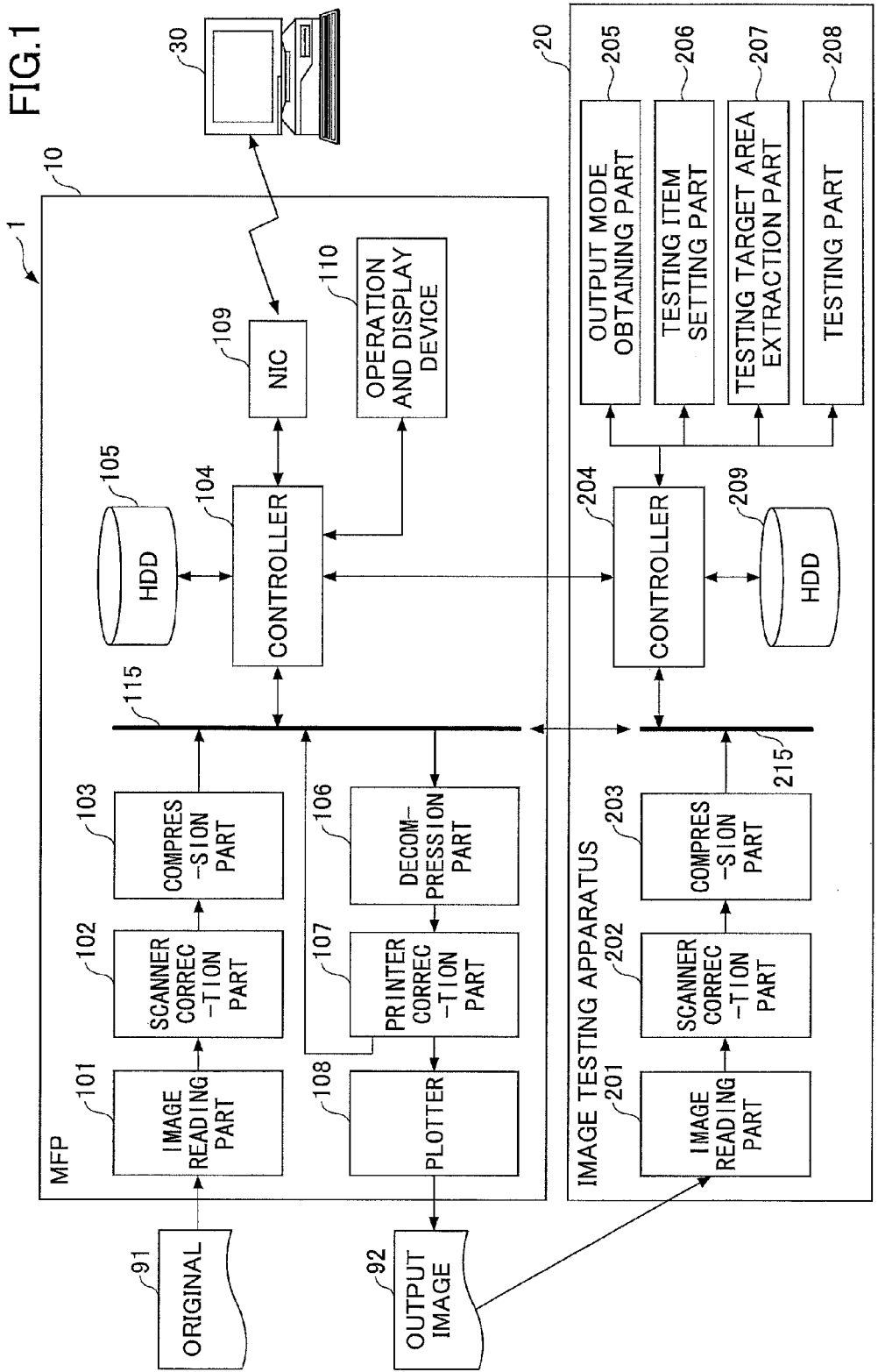
FIG. 1 is a block diagram showing a general configuration of an image testing system according to a first embodiment of the present invention.

FIG. 1 is a block diagram showing a general configuration of an image testing system according to a first embodiment of the present invention. As shown in FIG. 1, the image testing system 1 according to the first embodiment of the present invention includes a multifunction peripheral (MFP) 10 and an image testing apparatus 20. The MFP 10 prints, using original image data obtained from an original 91, onto a recording paper sheet or such, and outputs (prints) an output image 92. The image testing apparatus 20 tests the output image 92 which has been output onto the recording paper sheet or such.

The MFP 10 includes an image reading part 101, a scanner correction part 102, a compression part 103, a controller 104, a hard disk drive (HDD) 105, a decompression part 106, a printer correction part 107, a plotter 108, a network interface controller (NIC) 109 and an operation and display part 110.

In a case where the MFP 10 operates as a full color copier, the image reading part 101 reads original image data, decomposed into red (R), green (G) and blue (B), from the original 91, converts the original image data into digital data (RGB image data), and outputs the RGB image data.

The scanner correction part 102 carries out image processing on the RGB image data read by the image reading part 101 from the original 91, such as a scanner γ process, and/or a filtering process of separating the image area into characters/text, line drawing, pictures and so forth (image area separation), emphasizing the character/text parts and smoothing the picture parts. Thus, the scanner correction part 102 corrects the scanner characteristics or such of the original image data read by the image reading part 101.

The compression part 103 compresses the multi-level image data thus corrected by the scanner correction part 102, and outputs the data thus compressed to a general-purpose bus 115. The original image data thus compressed by the compression part 103 is sent to the controller 104 via the general-purpose bus 115.

The controller 104 includes a semiconductor memory or such (not shown), for example, and stores the original image data or the like, sent via the general-purpose bus 115, in the built-in semiconductor memory or such.

The HDD 105 acts as a large-capacity storage device and stores the original image data having been stored in the controller 104 as mentioned above.

It is noted that according to the first embodiment, the original image data is compressed as mentioned above. However, an embodiment of the present invention is not limited to the example, and if the band of the general-purpose bus 115 is sufficiently large and the capacity of the HDD 105 is large, it is also possible that the image data is handled in a state of not being compressed.

The controller 104 sends the original image data stored in the HDD 105 to the decompression part 106 via the general-purpose bus 115.

The decompression part 106 decompresses the compressed original image data to return it to be the multi-level image data, and sends the decompressed image data to the printer correction part 107.

The printer correction part 107 carries out correction processing on the original image data, for example, i.e., filtering, color correction, printer γ correction, tone processing or the like, according to the user's purpose of outputting the image. For example, the printer correction part 107 carries out, on the original image data, filtering in sharpness changing mode requested by the user, a color conversion process in a color conversion mode requested by the user, correction of the tone characteristics of the plotter 108, an image data quantizing process such as an error diffusion process, a dither process, or the like.

The plotter 108 is, for example, a transfer paper printing unit in which writing is carried out using a laser beam, or the like. The plotter 108 draws a latent image using the original image data on a photosensitive member, develops the latent image using toner, carries out a toner image transfer process, and forms a printed image (output image 92) of the original 91 onto the recording paper sheet (transfer paper sheet).

The NIC 109 delivers the image data that has been stored in the HDD 105 or such to an external PC terminal 30 or such via a communication network.

The operation and display device 110 receives an input of an image output mode by the user. For example, when the user has selected any one of a character/photograph mode, a character mode and a photograph mode, and further has selected the color conversion mode of changing a color, the sharpness changing mode of changing sharpness of the image, or such, using the operation and display device 110, the operation and display device 110 receives the thus selected image output modes including editing the image quality. Further, the image output modes thus input by the user using the operation and display device 110 are transmitted to the controller 104, and are stored in the controller 104.

The controller 104 sends instructions to the scanner correction part 102, the printer correction part 107, and so forth, to change image quality parameters according to the image output modes thus transmitted from the operation and display device 110. As a result, the MFP 10 can output (print) an image according to the user's request.

It is noted that in a case where the MFP 10 operates as a printer to print out using image data obtained from the external PC terminal 30 or such, the MFP 10 analyzes commands concerning printing (for example, page description language (PDL)) based on data received via the NIC 109, and expands the image data into a bitmap form in which the image data can be used for printing. For example, in the HDD 105, image data obtained from being expanded into a bitmap form and being compressed is written, or such.

For example, when the user tests an image using the image testing apparatus 20, the controller 104 of the MFP 10 obtains position information of an image testing target, characteristic data, and so forth, from, for example, the printer correction part 107, according to a request by a controller 204 of the image testing apparatus 20, and sends the obtained information/data to the controller 204. At this time, the controller 104 sends, to the controller 204, control information including information indicating the image output mode(s) designated by the user, the original image data on which the predetermined scanner correction (i.e., correction of the scanner characteristics of the image reading part 101) has been carried out, and so forth. It is noted that the position information of the image testing target and characteristics data will be described later.

Next, the image testing apparatus 20 will be described. The image testing apparatus 20 compares the output image 92 having been output onto a recording paper sheet or such and an original image obtained from reading the original 91 and used to output the output image 92 onto the recording medium, and tests an output state of the image.

The image testing apparatus 20 includes an image reading part 201, a scanner correction part 202, a compression part 203, the controller 204, an output mode obtaining part 205, a testing item setting part 206, a testing target area extraction part 207, a testing part 208 and a HDD 209.

The image reading part 201 reads an output image 92, having been output onto a recording paper sheet (output page) or such by the MFP 10, from the recording paper sheet or such, converts the read output image data into digital data, and outputs the digital data.

The scanner correction part 202 carries out, for example, γ correction or such on the output image data (digital data) obtained from the image reading part 201, and thus corrects the characteristics of the image reading part 201.

It is noted that according to the first embodiment, it is possible that the color space of the image data handled by the controller 104 of the MFP 10 and the color space of the image data handled by the controller 204 of the image testing apparatus 20 can be made to be the same as one another, as a result of the configuration of the scanner correction part 202 and the configuration of the scanner correction part 102 of the MFP 10 being made to be the same as one another. Further, as a result of using, for example, respective scanners having the same characteristics as the image reading part 101 of the MFP 10 and the image reading part 201 of the image testing apparatus 20, it is possible that the settings of γ correction and so forth in the scanner correction part 102 of the MFP 10 and the scanner correction part 202 of the image testing apparatus 20 can be made to be the same as each other.

The compression part 203 compresses the output image data of RGB each color having 8 bits obtained from the scanner correction part 202, and sends the compressed image data into a general-purpose bus 215. The compressed image data is then sent to the controlled 204 via the general-purpose bus 215.

The controller 204 has a semiconductor memory (not shown) or such, for example, and stores the output image data sent via the general-purpose bus 215 in the built-in semiconductor memory or such. It is noted that in a case where the band of the general-purpose bus 215 is sufficiently large and the capacity of the HDD 209 is large, the output image data may be handled in the state of not being compressed.

It is noted that as mentioned above, it is possible that the image data sent to the controller 104 of the MFP 10 and the image data sent to the controller 204 of the image testing apparatus 20 can have the color spaces the same as one another. In this case, it is possible that the original image data and the output image data are compared in the same color space when the original image data and the output image data are compared and image testing is carried out by the controller 204 of the image testing apparatus 20.

Further, the controller 204 generates, for example, control signals for controlling the respective output mode obtaining part 205, testing item setting part 206, testing target area extraction part 207 and testing part 208, and causes them to perform the respective functions.

When receiving, for example, an instruction that is input by the user using the operation and display device 110 or such to carry out image testing, the output mode obtaining part 205 requests, via the controller 204, the controller 104 of the MFP 10 to send information indicating the image output mode(s), designated by the user for outputting (printing) an original, and obtains the information indicating the image output mode(s) from the controller 104. It is noted that when obtaining the information indicating the image output mode(s), the controller 204 also obtains other information to be used in the image testing together, from the controller 104 of the MFP 10.

It is noted that the information indicating the image output mode(s) (simply referred to as image output mode information, hereinafter) may include, for example, the color conversion mode to change a color of the original image data, the sharpness changing mode to change the sharpness of the original image data and the background removal amount changing mode to change the background removal amount (or background removal amount level).

The testing item setting part 206 sets, as a testing item, an item for which the output state of the image is changed according to the image output mode information obtained by the output mode obtaining part 205 (i.e., an item concerning a manner of the image changing at the area at which the image receives the influence).

For example, in a case where the designated image output mode(s) includes the color conversion mode, the testing item setting part 206 sets, as the testing item, for example, an item of whether the testing target area of the output image data has been changed in the direction of chromaticity designated by the user from the original image data. As a result, it is possible to determine whether the image part requested by the user has been changed in the requested direction of chromaticity.

Further, in a case where the designated image output mode(s) includes the sharpness changing mode, the testing item setting part 206 sets, as the testing items, the densities at the respective testing target areas of the original image data and the output image data or the density changing amount (i.e., the difference in density) therebetween, for example. As a result, it is possible to determine, positively and effectively, whether the change in sharpness requested by the user has been carried out.

Further, in a case where the designated image output mode(s) includes the background removal amount changing mode, the testing item setting part 206 sets, as the testing items, the number of pixels included in the respective testing target areas of the original image data and the output image data, for example. As a result, it is possible to determine, positively and effectively, whether the change in background removal amount requested by the user has been carried out.

The testing target area extraction part 207 extracts, as a testing target area, an area at which the output state of the image changes, according to the image output mode information obtained by the output mode obtaining part 205. For example, based on the position information of the image testing target obtained from the printer correction part 107 of the MFP 10 via the controller 104, the testing target area extraction part 207 extracts the testing target area from the original image data which has been sent to the controller 204 of the image testing apparatus 20, the output image data, or the like.

For example, in a case where the image output mode is the color conversion mode, the testing target area extraction part 207 extracts, as the testing target areas, the color area before the color conversion in the original image data and the corresponding color area after the color conversion in the output image data, based on the position information of the pixels on which the color conversion has been carried out, and so forth, obtained from the printer correction part 107 of the MFP 10 via the controller 104. As a result, it is possible to determine how the color area has changed between before and after the color conversion.

For example, in a case where the image output mode is the sharpness changing mode, the testing target area extraction part 207 extracts, as the testing target areas, the edge area before filtering in the original image data and the edge area after the filtering in the output image data, obtained from the printer correction part 107 of the MFP 10 via the controller 104. As a result, it is possible to determine how the edge area has changed between before and after the filtering.

For example, in a case where the image output mode is the background removal amount changing mode, the testing target area extraction part 207 extracts, as the testing target areas, the area regarded as the background area in the original image data (for example, the area, the density of which is lower than a predetermined density); and the area regarded as the background area in the output image data based on the position information of the pixels of the corresponding area, the background removal amount level designated in the background removal amount changing mode and so forth, obtained from the printer correction part 107 of the MFP 10 via the controller 104. As a result, it is possible to determine how the area regarded as the background area has changed between before and after the background removal amount changing process.

The testing part 208 tests the output state of the image for each of the testing items that are set by the testing item setting part 206. For example, the testing part 208 carries out the testing based on the image characteristics (how the image changes) in the original image data and the output image data. Therefore, it is possible to positively determine that the output page has been properly changed according to the image output mode requested by the user. Specifically, the testing part 208 tests the output state of the image for each of the testing items at the testing target areas extracted by the testing target area extraction part 207. As a result, it is possible to effectively carry out the testing as to whether the output page has been properly changed according to the image output mode requested by the user.

Further, the testing part 207 tests the output state of the image based on the image characteristics at the testing target areas in the original image data and the output image data. Then, in a case where the requested change has occurred, the testing part 207 determines that the test has succeeded. In a case where the requested change has not occurred, the testing part 207 determines that the test has failed. The details of the image testing by the testing part 208 will be described later.

The result of the image testing by the testing part 208 is sent to the controller 104 of the MFP 10 via the controller 204. In a case where, for example, the result of the image testing is "failure", the result is displayed on the operation and display device 110 to call the user's attention, the operation of the MFP 10 is stopped, for example.

It is noted that a configuration may be provided in which the image testing apparatus 20 is integrally incorporated into the MFP 10 as an image forming apparatus. As a result, it is possible to realize the image testing in the compact configuration.

FIG. 10 shows a block diagram of an image forming apparatus 10' according to a variant example of the first embodiment in which the image testing apparatus 20 is integrally incorporated into the MFP 10 as mentioned above. The MFP 10 and the image testing apparatus 20 included in the image forming apparatus 10' may be the same as those described with reference to FIGS. 1 through 9D, and duplicate description will be omitted.

<Flow of Image Testing>

Figure 2:
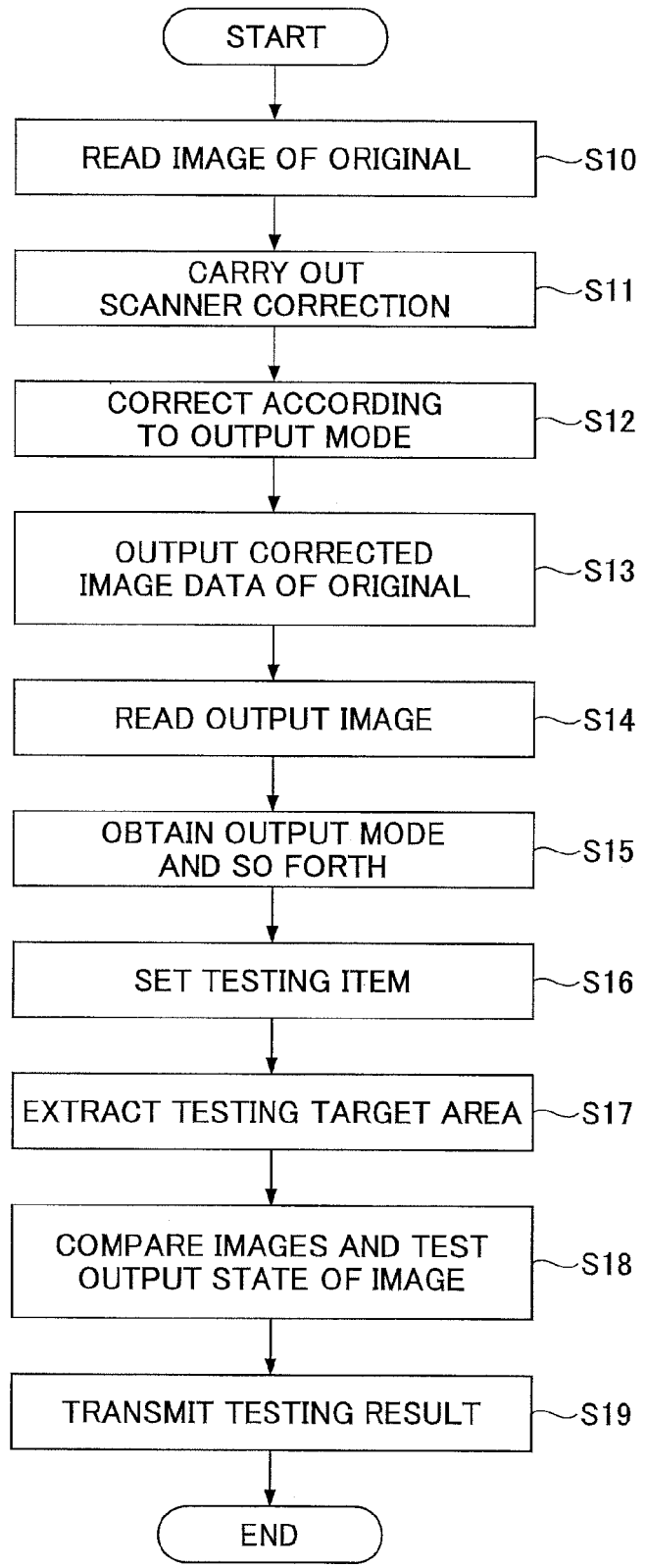
FIG. 2 is a flowchart showing a flow of image testing processes according to the first embodiment.

Next, using FIG. 2, a flow of the entirety of the image testing according to the first embodiment will be described. FIG. 2 is a flowchart showing a flow of image testing processes in the first embodiment.

When the user sets the original 91 onto the image reading part 101 of the MFP 10 and carries out an operation to give an instruction to read the original 91 from the operation and display device 110, the image reading part 101 reads the image of the original 91 (step S10), and the scanner correction part 102 carries out the predetermined scanner correction on the read original image data (step S11), as shown in FIG. 2.

Next, when the image output mode has been designated by the user from the operation and display device 110, the controller 104 carries out correction using the printer correction part 107, or the like, on the original image data on which the predetermined scanner correction has been carried out in step S11, according to the designated image output mode (step S12).

Next, the plotter 108 outputs the output image 92 using the original image data that has been corrected in step S12 onto a recording paper sheet (step S13).

When the user sets the recording paper sheet onto the image reading part 201 of the image testing apparatus 20 after the plotter 108 outputs the output image 92 using the original image data onto the recording paper sheet in step S13, the image reading part 201 reads the output image 92 that has been output onto the recording paper sheet from the recording paper sheet (step S14). It is noted that in step S14, a reading sensor which functions as the image reading part 201 may be provided near the exit from which the recording paper sheet (on which the plotter 108 of the MFP 10 has output the output image 92 using the original image data) exits, and the reading sensor may read the output image 92 from the recording paper sheet there. Thus, the MFP 10 and the image testing apparatus 20 may be physically unified. Further alternatively, a feeder may be provided for automatically delivering the recording paper sheet (on which the plotter 108 of the MFP 10 has output the output image 92 using the original image data) from the exit to the image reading part 201 of the image testing apparatus 20. In this case, the recording paper sheet is delivered to the image reading part 201 of the image testing apparatus 20, and the output image 92 is read from the delivered recording paper sheet by the image reading part 201 of the image testing apparatus 20.

Next, the output mode obtaining part 205 of the image testing apparatus 20 obtains the image output mode information designated by the user and so forth from the controller 104 of the MFP 10 via the controller 204 (step S15). It is noted that the controller 204 obtains, from the controller of the MFP 10, also the original image data on which the predetermined scanner correction has been carried out in step S11, the position information of the image testing target and the characteristic data, obtained from the printer correction part 107, and so forth.

The testing item setting part 206 sets, as a testing item, an item for which the output state of the image changes, according to the image output mode, information obtained in step S15 (step S16), and the testing target area extraction part 207 extracts, as testing target areas, the areas at which the output state of the image changes, according to the image output mode (step S17).

Next, the testing part 208 compares the images at the testing target areas extracted in step S17 for the testing item that is set in step S16, and tests the output state of the image (step S18).

Next, the controller 204 transmits the testing result obtained from the testing in step S18 (step S19), and finishes the processes.

<Scanner Correction Part 102>

Figure 3:
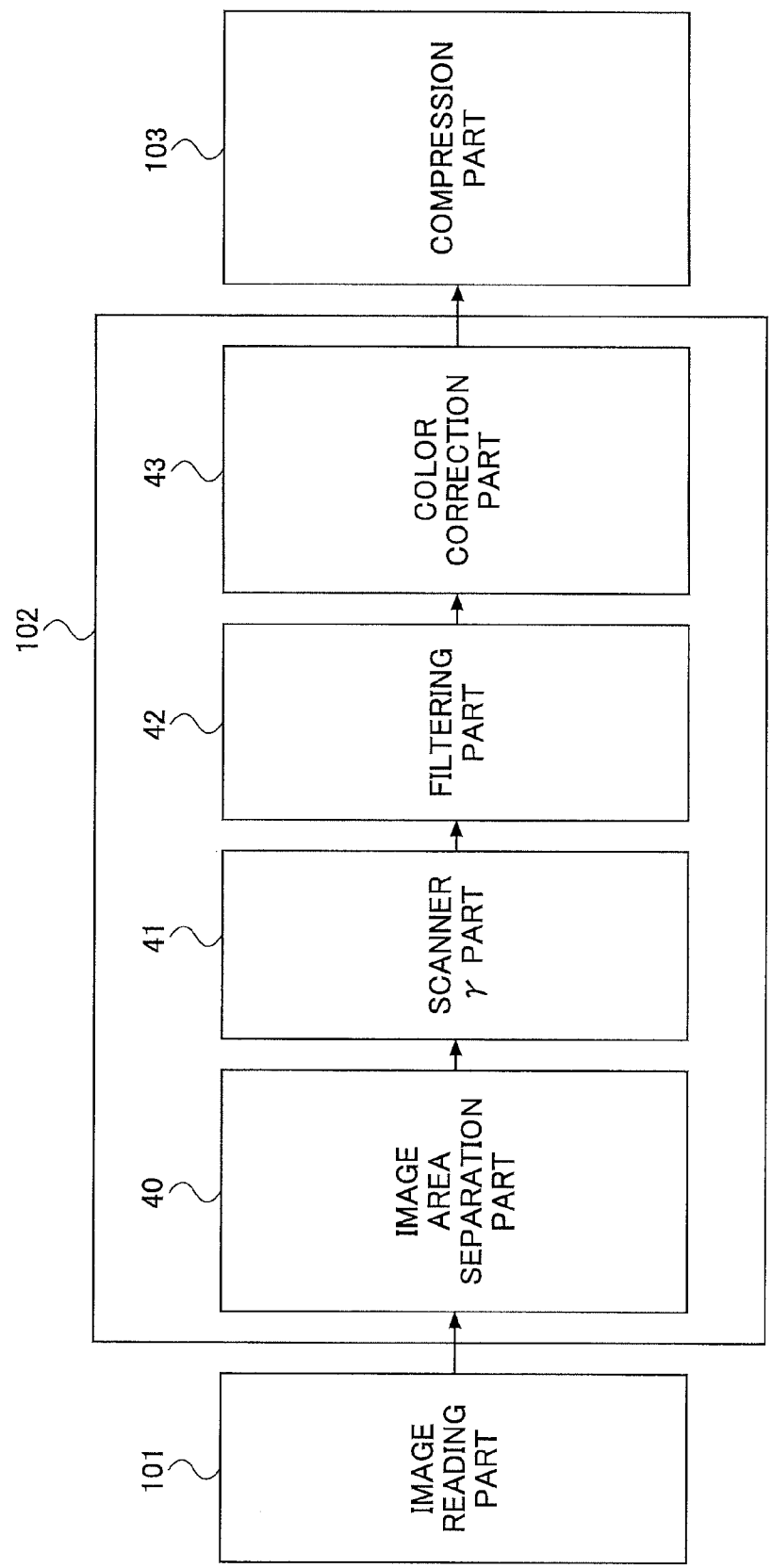
FIG. 3 is a block diagram of a scanner correction part included in a multifunction peripheral (MFP) shown in FIG. 1.

Next, using FIG. 3, the scanner correction part 102 of the MFP 10 will be described. FIG. 3 is a block diagram of the scanner correction part 102 included in the MFP 10 shown in FIG. 1.

As shown in FIG. 3, the scanner correction part 102 includes an area separation part 40, a scanner γ part 41, a filtering part 42 and a color correction part 43.

The scanner correction part 102 carries out processes of standardizing the scanner characteristics of the digital image data input by the image reading part 101 into predetermined scanner characteristics, and sends the thus processed digital image data. The image data for which the scanner characteristics have been thus standardized is stored in the inside of the MFP 10, and is sent having characteristics depending on an output destination in a case where the image data is reused.

The area separation part 40 determines, based on the RGB image data input from the image reading part 101, character/picture areas, chromatic/achromatic color areas, and so forth of the original, and sends the determination result to the subsequent modules as area separation information.

The scanner γ part 41 standardizes the lightness (or brightness) of the RGB image data input from the image reading part 101 into predetermined characteristics, and sends the thus processed RGB image data to the filtering part 42. According to the first embodiment of the present invention, the scanner γ part 41 converts, for example, reflectance linear characteristics into lightness (or brightness) linear characteristics.

The filtering part 42 standardizes the sharpness of the input RGB image data into predetermined characteristics, and sends the thus processed RGB image data to the color correction part 43. That is, the filtering part 42 carries out the conversion in order to obtain a predetermined modulation transfer function (MTF) characteristics value for each number of lines (of screen ruling) when having scanned a standard chart. The requested MTF characteristics value is different between a character area and a picture area, and therefore, correction is carried out separately for these areas. Thus, suitable filtering is carried out according to the determination result for character/picture areas obtained by the area separation part 40.

The color correction part 43 standardizes the colors of the input RGB image data into predetermined characteristics, and sends the thus processed RGB image data to the compression part 103. According to the first embodiment, the color correction part 43 carries out color conversion in order that the color space of the RGB image data becomes, for example, an Adobe-RGB color space defined by Adobe Systems Incorporated. Thus, it is possible to easily carry out image testing by converting image data into standard data.

<Printer Correction Part 107>

Figure 4:
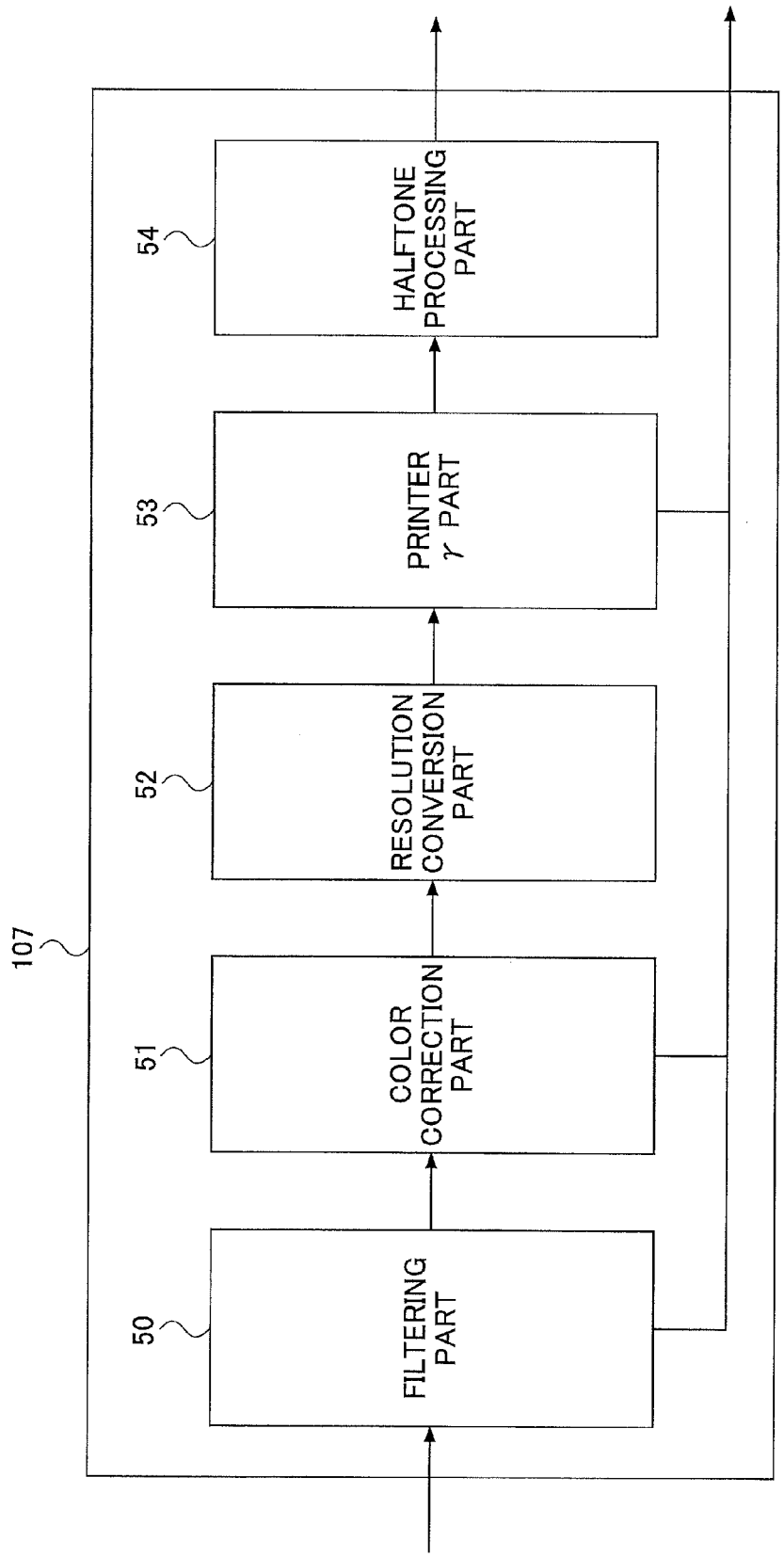
FIG. 4 is a block diagram of a printer correction part included in the MFP.

Next, using FIG. 4, the printer correction part 107 of the MFP 10 will be described. FIG. 4 is a block diagram of the printer correction part 107 included in the MFP 10.

As shown in FIG. 4, the printer correction part 107 includes a filtering part 50, a color correction part 51, a resolution conversion part 52, a printer γ part 53 and a halftone processing part 54.

The filtering part 50 corrects the sharpness of the RGB image data in order that reproducibility is improved when the RGB image data is output to the plotter 108. Specifically, the filtering part 50 reads the area separation information accompanying the image data and carries out increasing the sharpness or smoothing. For example, the filtering part 50 carries out emphasizing (i.e., increasing the sharpness) on the character area in order to make the characters/text clearer to improve the legibility, and carries out smoothing on the picture area in order to smooth the image.

As described above, the filtering part 42 of the scanner correction part 102 carries out conversion in order to standardize the sharpness of the image data so that the image will have the predetermined MTF characteristic value for each number of lines (of screen ruling). In contrast thereto, the filtering part 50 of the printer correction part 107 carries out a process in order to change the image according to how the user will use the output image. For example, in a case where the user has designated the character mode as an image quality mode, the filtering part 50 increases the degree of sharpness. In a case where the user has designated the picture mode as the image quality mode, the filtering part 42 increases the degree of smoothing.

When receiving the image data of RGB, each color having 8 bits, the color correction part 51 converts the received image data into image data having the color space of the plotter 108, i.e., image data of CMYK, each color having 8 bits, or image data of single color K having 8 bits.

In a case where the image is magnified or reduced in size, the resolution conversion part 52 carries out conversion of the resolution corresponding to the ratio of the magnifying or reduction in size, or certain conversion.

The printer γ part 53 converts the tone characteristics of the image according to the characteristics of an output destination to which the image is to be output. For example, the printer γ part 53 carries out the conversion in consideration of the output characteristics of the plotter 108 in order that the tone characteristics of the output image can be kept satisfactory, in a case where the plotter 108 is used to copy the image.

When having received the image data of CMYK, each color having 8 bits, or the image data of single color of K having 8 bits, the halftone processing part 54 converts the number of tone levels according to the tone processing capability of the plotter 108. For example, the halftone processing part 54 carries out conversion in number of tone levels to obtain image data of CMYK, each color having 2 bits, or K having 2 bits, using an error diffusion method which is one of pseudo halftone processing.

In a case where image testing is carried out according to the first embodiment, the controller 104 causes the printer correction part 107 or the like to output the necessary information for the image testing according to the image output mode designated by the user from the operation and display device 110.

<Example of Necessary Information for Image Testing>

Examples of the necessary information for image testing will now be described.

<In Case of Carrying Out Color Conversion Mode>

For example, a case of carrying out color conversion in the color conversion mode will be described. That is, a case will now be described where the user selects "color conversion mode" from the operation and display device 110, and designates to convert a color of a specific hue into a color of another hue.

In a case of ordinary image outputting, the image data is decomposed into four components, i.e., C, M, Y and K by the color correction part 51 of the printer correction part 107 of the MFP 10. On the other hand, in a case where, for example, color conversion from "cyan" into "magenta" is carried out in a full color mode, the color correction part 51 determines whether the three components other than the C component of the respective four CMYK color components have values equal to or less than a predetermined amount (for example, 1% or the like) for a target pixel.

At this time, in a case where the three components other than the C component have values merely equal to or less than the predetermined amount for the target pixel, the color correction part 51 determines that the target pixel is a pixel having only the C component (i.e., a pixel of cyan hue), and replaces the pixel by a pixel having only the M component (i.e., a pixel of magenta hue). Thus, the color conversion from "cyan" into "magenta" is realized.

Therefore, in a case where the user has designated the color conversion, for example, from "cyan" into "magenta" in the color conversion mode, the controller 104 causes the printer correction part 107 to output, as the position information of the image testing target, the coordinate information of the pixels of the image data determined to have only the C component in the original image data. Further, as the characteristic data, the respective pixel data of the image before the color conversion is caused to be output. Thus, the controller 104 causes the printer correction part 107 to output the position information of the pixels on which the color conversion is carried out and the characteristic data on which the color conversion is carried out.

<In Case of Carrying Out Sharpness Changing Mode>

Next, a case of carrying out a sharpness changing process in the sharpness changing mode will be described. For example, a case will now be described where the user has selected, as "sharpness setting", "sharp" or "smooth" from the operation and display device 110, and has designated the sharpness changing process to adjust the sharpness of the image.

For example, in a case where "sharp" (or "clear") has been selected in "sharpness setting", the filtering part 50 in the printer correction part 107 of the MFP 10 reduces the degree of smoothness and increases the degree of sharpness of the image. Thereby, the image becomes clearer as a whole, and in particular at an area at which the density of the original image changes sharply (i.e., an edge area), a distinct change occurs.

On the other hand, in a case where "smooth" has been selected in "sharpness setting", the filtering part 50 in the printer correction part 107 of the MFP 10 increases the degree of smoothness and reduces the degree of sharpness of the image. Thereby, the image is smoothed as a whole, and in particular at the edge area, a distinct change occurs. It is noted that in the above-mentioned adjusting of the sharpness of the image, the filtering part 50 detects the edge area from the image using known techniques, and carries out filtering on the edge area.

Therefore, in a case where the sharpness changing mode has been designated, the controller 104 causes the printer correction part 107 to output, as the position information of the image testing target, the coordinate information of the edge area of the original image data on which the filtering is carried out by the filtering part 50. Further, as the characteristic data, the image data of the edge area before the filtering is carried out is caused to be output. This is because, as described above, the image data at the edge area is influenced by "sharpness setting" the most.

<In Case of Carrying Out Background Removal Amount Changing Mode>

Next, a case of carrying out a background removal amount changing process in the background removal amount changing mode will be described. A case will now be described where, for example, the user gives an instruction from the operation and display device 110 to change the background removal amount level in order to change the background removal amount.

For example, the printer γ part 53 of the printer correction part 107 carries out processing to obtain the image close to the original image by carrying out correction considering the characteristics of the plotter 108. However, if the background part of the original is not processed, there is a likelihood that even a dark color of a low-quality paper sheet of the original, dirty marks or such on the background, or the like, may be reproduced. Therefore, in a default (ordinary output) mode, the area of the original having lightness (or brightness) in a level equivalent to the density (for example, density: 0.08 or the like) of recycled paper which is used in normal offices is regarded as "background", γ processing is carried out in order that the "background" becomes lighter (or brighter), and thus, background removal is carried out.

In a case of, for example, using paper which is inferior in whiteness such as coarse paper as the original or reading the original having remarkable dirty marks or such on the background, the user may adjust the background removal amount in order to prevent the dirty color of the paper or the dirty marks or such on the background from being reproduced, by increasing the background removal amount. Further, in a case of using paper which is superior in whiteness or intending to reproduce yellow written by a highlight pen having the high lightness (or brightness) of the original to the highlight side, the user may carry out adjustment to reduce the background removal amount in order to more closely reproduce the original to the highlight side than the default mode.

Therefore, in a case where the user has designated the image output mode (i.e., the background removal amount changing mode) to change the background removal amount level, the printer γ part 53 regards, as "background", the area of the input image, the density of which area is equal to or lower than a predetermined value which is previously determined according to the designated background removal amount level, and carries out background removal on the area regarded as "background".

Therefore, in a case where the background removal amount changing mode has been designated, the controller 104 causes the printer correction part 107 to output, as the position information of the image testing target, the coordinate information of the pixels regarded as "background" in the image which is input to the printer γ part 53 at the time of ordinary output (default mode). Further, as the characteristic data, the number of pixels regarded as "background" at the time of ordinary output is caused to be output.

<Controller 104>

Figure 5:
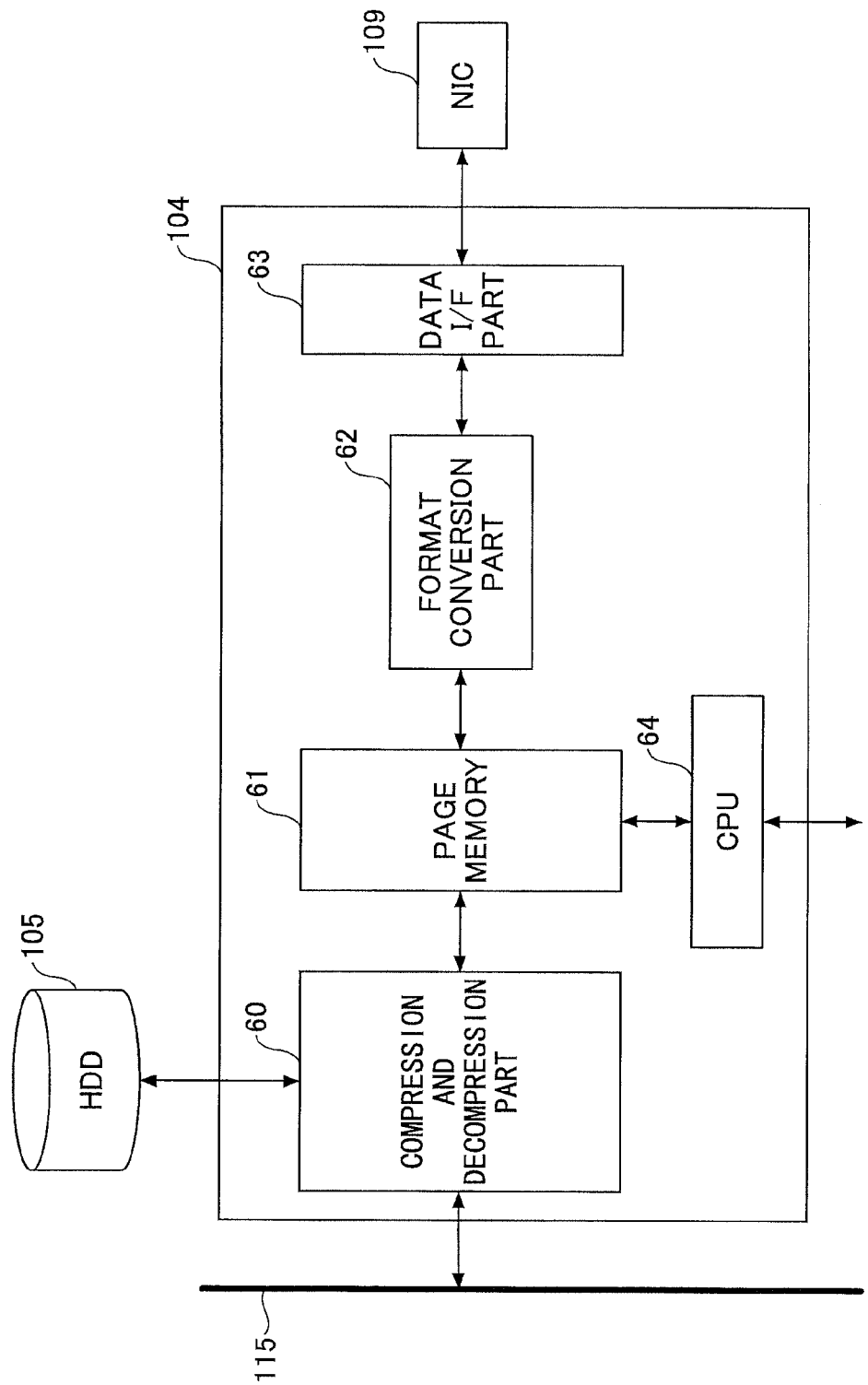
FIG. 5 is a block diagram of a controller included in the MFP.

Next, using FIG. 5, the controller 104 of the MFP 10 will be described. FIG. 5 is a block diagram of the controller 104 included in the MFP 10. It is noted that in the description below, a flow of data will be described in a case where the controller 104 outputs image data to an external apparatus or the like.

As shown in FIG. 5, the controller 104 includes a compression and decompression part 60, a page memory 61, a format conversion part 62, a data I/F part 63, and a central processing unit (CPU) 64.

The compression and decompression part 60 decompresses the image data obtained from the general-purpose bus 115 or the HDD 105 into data having 8 bits for each color.

On the page memory 61, the image data decompressed by the compression and decompression part 60 is expanded into a bitmap form.

The format conversion part 62 carries out color conversion on the image data obtained from the page memory 61 to be suitable for being output externally such as sRGB or such, and also, converts the image data into a general-purpose image format such as a JPEG, TIFF or such.

The data I/F part 63 sends the data obtained from the format conversion part 62 to the NIC 109.

When having received the user's instruction concerning the image output mode from the operation and display device 110, the CPU 64 gives instructions to set image quality parameters to the scanner correction part 102 and/or the printer correction part 107.

It is noted that as the instructions to set image quality parameters to be given to the scanner correction part 102, there are those for setting a parameter of attaching importance to characters/text to the area separation part 40, in a case where, for example, the character mode has been requested as the image quality mode. As the instructions to set image quality parameters to be given to the printer correction part 107, there are those for setting a parameter of attaching importance to the sharpness to the filtering part 50, in a case where, for example, the character mode has been requested as the image quality mode. In a case where the photograph mode has been requested, there are instructions for setting a parameter of attaching importance to smoothness to the filtering part 50 and/or setting a parameter of attaching importance especially to color reproducibility to the color correction part 51.

According to the first embodiment, when the CPU 64 sends instructions to the printer correction part 107 to send, for example, the position information of the image testing target, the characteristic data and so forth, the CPU 64 may send the instructions also to the scanner correction part 102.

Further, at a time of carrying out the image testing, the CPU 64 sends instructions, in response to a request from the controller 204 of the image testing apparatus 20, to send to the controller 204 the original image data stored in the HDD 105 on which the predetermined scanner correction has been carried out, control information such as the image output mode information designated by the user, and so forth, the position information of the image testing target, the characteristic data, and so forth, obtained from the printer correction part 107, and so forth.

It is noted that the CPU 64 converts the image data into brightness and color difference signals using the format conversion part 62, and then, sends the converted image data (brightness and color difference signals) to the controller 204 of the image testing apparatus 20 via the general-purpose bus 115.

Further, in a case where the MFP 10 operates as a printer and, for example, image data from the external PC terminal 30 or such is output to the plotter 108, the CPU 64 analyzes the page description language transmitted from the external PC terminal 30 or such, and expands the image data of RGB, each color having 8 bits, into the bitmap form on the page memory 61. Further, the CPU 64 compresses the image data expanded onto the page memory 61 using the compression and decompression part 60, as is necessary, and sends the compressed image data to the general-purpose bus 115. It is noted that the flow of outputting the image data to the plotter 108 in this case is the same as the flow in a case where the MFP 10 operates as a copier.

In the HDD 105, the image data on which the characteristics unique to the image reading part 101 (i.e., the scanner characteristics) have been corrected by the scanner correction part 102, the control information such as the image output mode information designated by the user, and so forth, are stored, as being associated together.

<Controller 204>

Next, using FIG. 6, the controller 204 of the image testing apparatus 20 will be described. FIG. 6 is a block diagram of the controller 204 included in the image testing apparatus 20 shown in FIG. 1.

As shown in FIG. 6, the controller 204 includes a compression and decompression part 70, a page memory 71, a format conversion part 72 and a CPU 73.

The controller 204 obtains, from the MFP 10, the image data (hereinafter referred to as "image data 1") obtained as a result of the predetermined scanner correction being carried out on the original image data (read by the image reading part 101), the control information such as the image output mode information designated by the user accompanying the image data, the position information of the image testing target, the characteristic data, and so forth.

Further, the controller 204 obtains the image data (hereinafter referred to as "image data 2") obtained as a result of the output image data read by the image reading part 201 being corrected by the scanner correction part 202.

The compression and decompression part 70 decompresses the image data obtained from the general-purpose bus 215 or the HDD 209 into data having 8 bits for each color. On the page memory 71, the image data thus decompressed by the compression and decompression part 70 is expanded into a bitmap form.

The format conversion part 72 converts the image data 2 into brightness and color difference signals.

The CPU 73 uses the testing part 208, and compares the image data 1 having been converted by the format conversion part 62 and the image data 2 having been converted by the format conversion part 72. Further, the CPU 73 uses the testing part 208 to determine, as a result of the image testing, "success (satisfactory)" or "failure (not satisfactory)" based on the comparison between the image data 1 and the image data 2, and reports the determined result to the controller 104 of the MFP 10.

It is noted that the CPU 73 switches the contents of testing (comparison) to be carried out using the testing part 208 according to the user's instructions concerning the image output mode (image output mode information) included in the control information obtained from the controller 104 of the MFP 10. It is noted that the instructions designating the image output mode(s) may include image quality editing (image editing) contents which can be set from the operation and display device 110, such as a character/photograph mode, the character mode and the photograph mode, which are the image quality modes, "color conversion mode", "sharpness changing mode", "background removal amount changing mode", and so forth.

It is noted that in a case where "failure" has been reported as the result of the image testing, the controller 104 of the MFP 10 warns the user by displaying this matter, and further stops an operation of the MFP 10 if the MFP 10 is operating, for example.

<Examples of Image Testing by Testing Part 208>

Examples of the image testing carried out by the testing part 208 will now be described.

<Example of Image Testing in Case of Carrying Out Color Conversion>

Figure 7B:
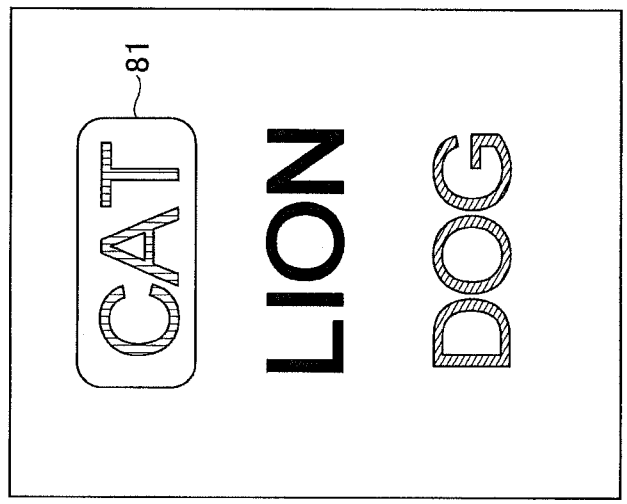
FIGS. 7A and 7B show image testing targets in a case where a color conversion mode is carried out.
Figure 7A:
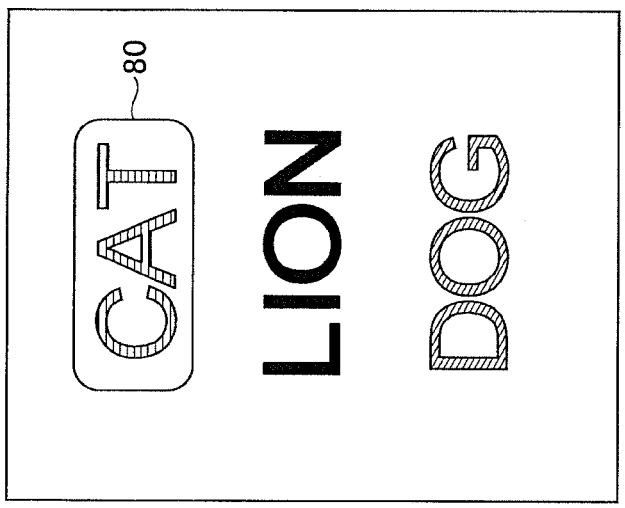

As an example, a case where the color conversion mode is carried out will now be described using FIGS. 7A and 7B. FIGS. 7A and 7B show image testing targets in a case where the color conversion mode is carried out. FIG. 7A shows an example of an image of the image data 1, and FIG. 7B shows an example of an image of the image data 2.

In a case where the color conversion mode has been designated by the user, the position information of the pixels on which the color conversion has been carried out, information indicating which color has been changed into which color, the image data 1 (for example, the image shown in FIG. 7A), and so forth, are transmitted to the controller 204 of the image testing apparatus 20 from the controller 104 of the MFP 10 in response to the request from the output mode obtaining part 205.

Then, based on the information thus transmitted to the controller 204 of the image testing apparatus 20, the testing item setting part 206 sets, as the testing item, an item as to whether the testing target area in the image data 2 shown in FIG. 7B has been changed in the direction of chromaticity designated by the user. Further, based on the position of the pixels on which the color conversion has been tarried out, the testing target area extraction part 207 extracts, as the testing target areas, the color area 80 (i.e., the character part of "CAT" in FIG. 7A) in the image data 1 and the corresponding color area 81 (i.e., the character part of "CAT" in FIG. 7B) in the image data 2.

The image data 1 and the image data 2 are those already converted into the brightness and color difference signals. Therefore, the testing part 208 uses, for example, the L*a*b* signals as the brightness and color difference signals, compares the respective testing target areas (the color area 80 and the color area 81) of the image data 1 and the image data 2, and determines whether the testing target area (the color area 81) has been changed in the direction of chromaticity designated by the user.

In a case where, for example, color conversion from "cyan" to "magenta" is carried out in the color conversion mode, the testing part 208 compares the respective average values in the testing target areas (the color area 80 and the color area 81) of the image data 1 and the image data 2. Then, in a case where the chromaticity of the color area 81 of the image data 2 shown in FIG. 7B has been changed in the positive a* direction by a predetermined amount or more in comparison to the chromaticity of the color area 80 of the image data 1 shown in FIG. 7A, the testing part 208 determines "test success". Thus, it is possible to determine that the color conversion requested by the user has been positively reflected on the output page.

Thus, even without determining whether the L*a*b* value of the testing target area of the image data 2 coincides with the accurate L*a*b* value of magenta, it is possible to determine that the requested editing has been carried out when the average chromaticity of the testing target area of the image data 2 has been changed in the expected direction by the predetermined amount or more from the image data 1. It is noted that in order to carry out the testing with higher accuracy, it is also possible that a patch is previously output using a magenta toner which is used in the printing, the L*a*b* value thereof is previously measured from the paper, and it is determined "test success" only when the color difference from the L*a*b* value of the testing target area of the image data 2 is, for example, equal to or less than 3. As a result, it is possible to determine, with higher accuracy, that the color conversion requested by the user has been positively reflected on the output page.

<Example of Image Testing in Case of Changing Sharpness>

Figure 8C:
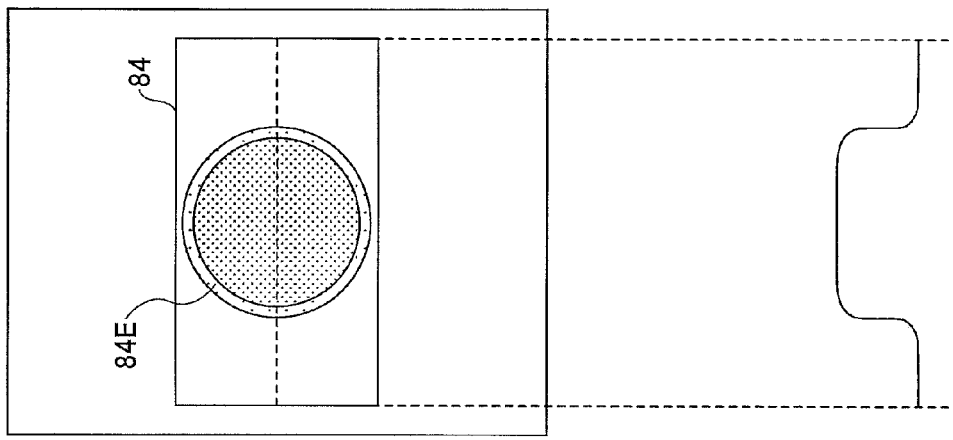
FIGS. 8A, 8B and 8C show image testing targets in a case where a sharpness changing mode is carried out.
Figure 8B:
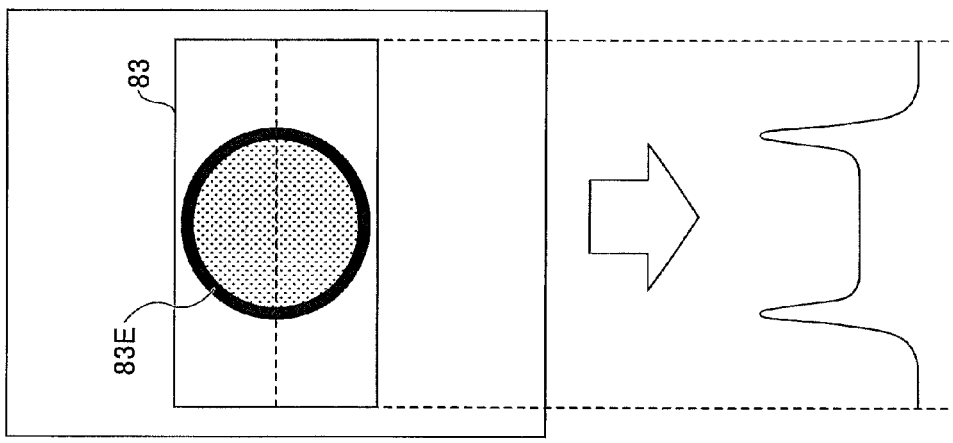
Figure 8A:
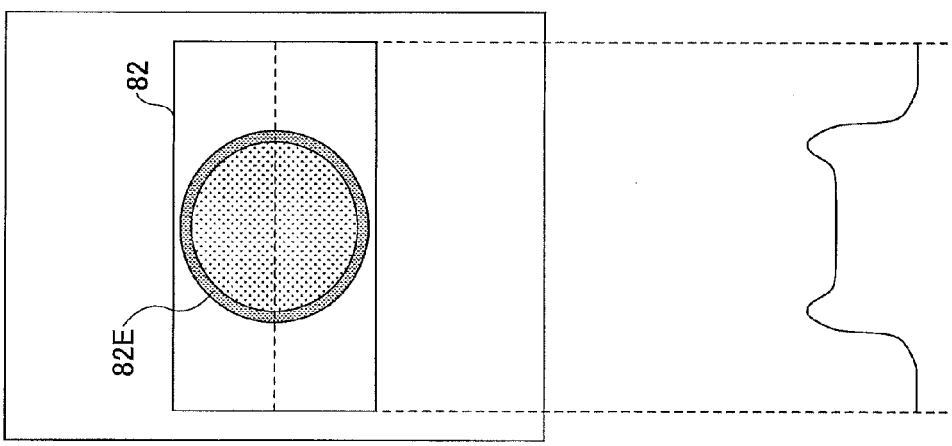

Using FIGS. 8A, 8B and 8C, a case where the sharpness changing mode is carried out will be described. FIGS. 8A, 8B and 8C show image testing targets in a case where the sharpness changing mode is carried out. FIG. 8A shows an example of an image of image data 1. FIG. 8B shows an example of an image of image data 2 in a case where "sharp" (or "clear") is set as "sharpness setting" in the sharpness changing mode. FIG. 8C shows an example of an image of image data 2 in a case where "smooth" is set as "sharpness setting" in the sharpness changing mode. At bottoms of the images in FIGS. 8A, 8B and 8C, respective density changing amounts are shown along broken lines.

In a case where the user has set the sharpness changing mode, the image data at the edge area of the image data 1 before the filtering (for example, the image data obtained from extracting the circumferential part 82E from the area 82 shown in FIG. 8A), the image output mode information indicating that "sharp" or "smooth" has been set as "sharpness setting", and so forth, are transmitted to the controller 204 of the image testing apparatus 20 from the controller 104 of the MFP 10 in response to the request or such from the output mode obtaining part 205.

Then, based on the information thus transmitted to the controller 204 of the image testing apparatus 20, the testing item setting part 206 sets, as the testing item, the density or density changing amount in the image data at the testing target area of the image data 2. Further, the testing target area extraction part 207 extracts, as the testing target areas, the above-mentioned image data at the edge area of the image data 1 before the filtering (for example, the image data obtained from extracting the circumferential part 82E from the area 82 shown in FIG. 8A) and the image data at the edge area of the image data 2 after the filtering (for example, the image data obtained from extracting the circumferential part 83E from the area 83 shown in FIG. 8B or the image data obtained from extracting the circumferential part 84E from the area 84 shown in FIG. 8C). It is noted that the testing target area extraction part 207 can obtain the image data at the edge area or the like obtained from the filtering of the image data 2 by carrying out edge detection using known techniques.

The testing part 208 totals all of the density digital values for the image data extracted as the testing target areas of the image data 1 and the image data 2, respectively. It is noted that the total of the density digital values is larger in the image having higher sharpness, and the total of the density digital values is smaller in the image having lower sharpness.

For example, in a case where the user has set "sharp" (or "clear") as "sharpness setting", the total of the density digital values at the circumferential part 83E in the area 83 shown in FIG. 8B becomes larger than the total of the density digital values at the circumferential part 82E in the area 82 shown in FIG. 8A. Therefore, when the total of the density digital values at the circumferential part 83E in the area 83 shown in FIG. 8B is larger than the total of the density digital values at the circumferential part 82E in the area 82 shown in FIG. 8A, the testing part 208 determines that the editing has been properly carried out and determines "test success". It is noted that as another method, it is also possible that when the total of the density digital values at the circumferential part 83E in the area 83 shown in FIG. 8B is larger than the total of the density digital values at the circumferential part 82E in the area 82 shown in FIG. 8A by a predetermined amount or more, the testing part 208 determines that the editing has been properly carried out and determines "test success". Thus, it is possible to effectively determine that the change in sharpness requested by the user has been positively reflected on the output page.

Further, in a case where the user has set "smooth" as "sharpness setting", the total of the density digital values at the circumferential part 84E in the area 84 shown in FIG. 8C becomes smaller than the total of the density digital values at the circumferential part 82E in the area 82 shown in FIG. 8A. Therefore, when the total of the density digital values at the circumferential part 84E in the area 84 shown in FIG. 8C is smaller than the total of the density digital values at the circumferential part 82E in the area 82 shown in FIG. 8A, the testing part 208 determines that the editing has been properly carried out and determines "test success". The same as the above, it is noted that as another method, it is also possible that when the total of the density digital values at the circumferential part 84E in the area 84 shown in FIG. 8C is smaller than the total of the density digital values at the circumferential part 82E in the area 82 shown in FIG. 8A by a predetermined amount or more, the testing part 208 determines that the editing has been properly carried out and determines "test success". Thus, it is possible to effectively determine that the change in sharpness requested by the user has been positively reflected on the output page.

<Example of Image Testing in Case of Carrying Out Background Removal Amount Changing Mode>

Using FIGS. 9A, 9B, 9C and, 9D, a case where the background removal amount changing mode is carried out will be described. FIGS. 9A, 9B, 9C and 9D show image testing targets in a case where the background removal amount changing mode is carried out. FIG. 9A shows an example of an image of image data 1, and the image includes three density areas A1, A2 and A3. The outer area A1 is a pure white area. The intermediate area A2 is a light hatched area. The inner area A3 is a dark hatched area.

FIG. 9B shows an example of an image of image data 2 in the default (ordinary output) mode. FIG. 9C shows an example of an image of image data 2 in a case where the background removal amount level "large" is selected. FIG. 9D shows an example of an image of image data 2 in a case where the background removal amount level "small" is selected.

In a case where the user has designated the background removal amount changing mode, the position information of the pixels at the area (for example, the area 85 in FIG. 9A) regarded as background in the image data 1, the number of the pixels, the image output mode information indicating the background removal amount level designated by the user in the background removal amount changing mode, and so forth, are transmitted to the controller 204 of the image testing apparatus 20 from the controller 104 of the MFP 10 in response to the request or the like from the output mode obtaining part 205.

Then, based on the information thus transmitted to the controller 204, the testing item setting part 206 sets, as the testing item, the number of pixels at the area regarded as the background area in the image data 2. Further, the testing target area extraction part 207 extracts, as the testing target area, the area (for example, the image area, the density of which is lower than the density previously set according to the background removal amount level) regarded as the background area in the image data 2.

It is noted that the reference value for the area regarded as the background area in the image data 1 is different from the reference value for the area regarded as the background area in the image data 2. For example, in the image data 1, the area equal to or lower than image data "30" or the like is regarded as the background area. In the image data 2, the area equal to or lower than image data "10" or the like, for example, is regarded as the background area, according to the background removal amount level designated by the user in the background removal amount changing mode. It is noted that the larger the background removal amount level becomes, the larger the reference value becomes. Further, as a logic of the image data, the ideal white corresponds to image data "0", and, the darker an image becomes, the larger the corresponding value becomes (the maximum value is image data "255"). As the reference value for the image data 1, a boundary value to determine the background area (for example, the area 86 in FIG. 9B) in the default mode after the γ conversion is carried out by the printer γ part 53 on the image data 1 is set.

The testing part 208 obtains the number of pixels at the area regarded as the background area in the image data 2, and compares the obtained number of pixels with the number of pixels at the area regarded as the background area in the image data 1. For example, in a case where the user has set the background removal amount level "large" in the background removal amount changing mode, the testing part 208 determines "test success" when the number of pixels at the area (for example, the area 87 in FIG. 9C) regarded as the background area in the image data 2 is increased from (or greater than) the number of pixels at the area (for example, the area 85 in FIG. 9A) regarded as the background area in the image data 1. The testing part 208 determines "test failure" when the number of pixels at the area regarded as the background area in the image data 2 is equal to or reduced from the number of pixels at the area regarded as the background area in the image data 1. Thus, it is possible to effectively determine that the change in background removal amount requested by the user has been positively reflected on the output page.

Further, in a case where the user has set the background removal amount level "small" in the background removal amount changing mode, the testing part 208 determines "test success" when the number of pixels at the area (for example, the area 88 in FIG. 9D) regarded as the background area in the image data 2 is reduced from the number of pixels at the area (for example, the area 85 in FIG. 9A) regarded as the background area in the image data 1. The testing part 208 determines "test failure" when the number of pixels at the area regarded as the background area in the image data 2 is equal to or increased from (or greater than) the number of pixels at the area regarded as the background area in the image data 1. Thus, it is possible to effectively determine that the change in background removal amount requested by the user has been positively reflected on the output page. It is noted that the above-mentioned reference value (determination criterion) can be changed according to the user's designation carried out from the operation and display device 110.

Second Embodiment

Next, a second embodiment of the present invention will be described.

It is noted that the second embodiment has the same or similar configuration as that of the above-descried first embodiment, and only the points different from the first embodiment will be described.

For example, in a case where a "color balance adjustment mode" is designated as the image output mode by the user from the operation and display device 110 and the user gives an instruction to change the colors in the entirety of the image, the colors in the entirety of the output image data will be changed from the original image data in the MFP 10. Therefore, it is not necessary to extract a specific area(s) as the testing target area(s). Accordingly, in such a case, the printer correction part 107 is not caused to output the position information of the image testing target, the characteristic data, and so forth, and the testing part 208 compares the $L^*a^*b^*$ values of the respective entireties of the image data 1 and the image data 2, and determines whether the $L^*a^*b^*$ values have changed in the direction designated by the user. Thus, it is possible to determine, by a method suitable to the image output mode designated by the user, that the change in colors in the entirety of the image requested by the user has been positively reflected on the output page.

Further, in a case where, for example, a "density adjustment mode" is designated as the image output mode by the user from the operation and display device 110 and the user gives an instruction to change the densities in the entirety of the image, the densities in the entirety of the output image data will be changed from the original image data in the MFP 10. Therefore, it is not necessary to extract a specific area(s) as the testing target area(s). Accordingly, in such a case, the printer correction part 107 is not caused to output the position information of the image testing target, the characteristic data, and so forth, and the testing part 208 compares the $L^*$ values of the respective entireties of the image data 1 and the image data 2. Further, in a case where the user has made a setting to increase the densities (to be darker) in the density adjustment mode, the testing part 208 determines "test success" when the $L^*$ values in the image data 2 have been reduced by an amount, previously set, or more. In a case where the user has made a setting to reduce the densities (to be lighter) in the density adjustment mode, the testing part 208 determines "test success" when the L* values in the image data 2 have been increased by an amount, previously set, or more. Thus, it is possible to determine, by a method suitable to the image output mode designated by the user, that the change in densities in the entirety of the image requested by the user has been positively reflected on the output page.

Third Embodiment

Next, a third embodiment of the present invention will be described.

It is noted that the third embodiment has the same or similar configuration as that of the above-descried first embodiment or second embodiment, and only the points different from the first embodiment or second embodiment will be described.

For example, in a case where the "character mode" is designated by the user as the image quality mode from the operation and display device 110, the image testing apparatus 20 carries out two sets of image testing, corresponding to the respective cases of the above-mentioned sharpness changing mode and the background removal amount changing mode. It is noted that the two sets of image testing are separate tests, and can be carried out separately. The necessary information for the image testing is output from the plural modules included in the printer correction part 107 when the image data 1 passes through the printer correction part 107 simultaneously, and is transmitted to the controller 104.

In a case where the user selects the "character mode" as the image quality mode, it seems that the user wishes to cause characters/letters, including those written by a pencil, light characters/letters, and so forth, for example, to be clearly or sharply output. Further, it seems that the user does not wish to cause the light colored background of the original to be closely reproduced and wishes to carry out background removal on some background parts and cause the characters/letters to stand out. Therefore, in a case where the "character mode" has been designated, an item as to whether the edge area has become darker in the image data 2 than the image data 1, and an item as to whether the background removal has been carried out more (i.e., the background removal amount level is higher) in the image data 2 than the image data 1, are set as the testing items. Thereby, it is possible to determine that the "character mode" has been properly processed, and effectively determine that the image output mode requested by the user has been positively reflected on the output page.

In a case where the user selects the "photograph mode" as the image quality mode, it seems that the user wishes to obtain an output image which is smooth in contrast to the above. Therefore, as the testing item, an item, as to whether the densities at the edge area are reduced by filtering in the image data 2 more than in the image data 1, is set. As a result, it is possible to effectively determine that the image output mode requested by the user has been positively reflected on the output page.

<Using Program>

Each of the above-described embodiments of the present invention may be applied to a system including plural apparatuses (for example, a host computer, an interface unit, a scanner, a printer, and so forth), and further, may be applied to a single apparatus (for example, a host computer, an interface unit, a scanner, a printer, or the like).

Further, the present invention can be realized as a result of a recording medium, in which program code of software realizing the respective functions of each of the embodiments described above is recorded, being supplied to a system or an apparatus, and the system or apparatus (CPU, MPU, DSP or such) executing the program code recorded in the recording medium. In this case, the program code itself read from the recording medium realizes the respective functions of each of the embodiments described above, and the program code itself or the recording medium itself storing the program code can be regarded as an embodiment of the present invention. As a result, it is possible to realize the functions of each of the embodiments described above using a general-purposed system or apparatus.

For example, program code of software realizing the respective functions of the output mode obtaining part 205, the testing item setting part 206, the testing target area extraction part 207 and the testing part 208 (shown in FIG. 1) may be stored in a memory (not shown) included in the CPU 73 (shown in FIG. 6), and the CPU 73 may execute the program code. Thus, the CPU 73 may act as the output mode obtaining part 205, the testing item setting part 206, the testing target area extraction part 207 and the testing part 208.

It is noted that as the recording medium used to supply the program code, a FD, a hard disk, an optical recording medium, a magneto-optical recording medium, a semiconductor recording medium or such, such as an optical disc, a magneto-optical disc, a CD-ROM, a CD-R, a magnetic tape, a non-volatile memory, a ROM or the like, can be used.

Further, in embodiments of the present invention, not only a configuration in which the respective functions of the embodiments are realized as a result of the computer reading and executing the program code, but also a configuration in which the above-mentioned functions are realized by processing as a result of an operating system (OS) or the like operating in a computer performing a part or all of the actual processing based on instructions of the program code, are included.

Further, as an embodiment of the present invention, a configuration is included in which the program code read from the recording medium is written in a memory included in a function extension board inserted into a computer or a function extension unit connected to the computer, and then, based on the instructions of the program code, the CPU or the like included in the function extension board or the function extension unit performs a part or all of the actual processing, and thus, the functions of the embodiments described above are realized by the processing.

Thus, according to the embodiments of the present invention, it is possible to determine whether an output page (output image) has been properly changed according to an image output mode requested by the user. It is noted that each of the embodiments according to the present invention may be applied to a laser printer, a photograph printing machine, or the like, as a single apparatus, which has modes by which an output state of an image is changed.

The present invention is not limited to the specifically disclosed embodiments, and variations and modifications may be made without departing from the scope of the present invention.

The present Patent Application is based on Japanese Priority Patent Application No. 2011-015752, filed Jan. 27, 2011 and Japanese Priority Patent Application No. 2012-6494, filed Jan. 16, 2012, the entire contents of which are hereby incorporated herein by reference.

What is claimed is:

1. An image testing apparatus configured to compare output image data of an image which has been printed onto a recording medium by an external output apparatus and original image data which has been read from an original and is used to print the image onto the recording medium, and determine an output state of the image, the image testing apparatus comprising:
- an image reading part configured to generate the output image data by reading, from the recording medium, the image printed on the recording medium;
- an output mode obtaining part configured to obtain, from a controller of the external output apparatus, an output mode designated by a user on the external output apparatus, in response to an obtaining request sent from the image testing apparatus to the controller of the external output apparatus, the output mode indicating requested changes with respect to image characteristics of the original image data;
- a testing item setting part configured to set, according to the output mode obtained by the output mode obtaining part, an item for which the output state of the image is changed, as a testing item; and
- a testing part configured to test, based on the requested changes indicated by the output mode, the output state of the image for the testing item which is set by the testing item setting part by,
    - detecting differences between the image characteristics of the output image data and image characteristics of the original data, and
    - determining, based on the detected differences, whether the output image data was changed relative to the original data in a manner that corresponds to the requested changes.

2. The image testing apparatus as claimed in claim 1, wherein the testing part is configured to test the output state of the image based on image characteristics of the original image data and the output image data.

3. The image testing apparatus as claimed in claim 1, further comprising:
- a testing target area extraction part configured to extract, as a testing target area, an area at which the output state of the image is changed according to the output mode, wherein
- the testing part is configured to test the output state of the image for the testing item at the testing target area extracted by the testing target area extraction part.

4. The image testing apparatus as claimed in claim 1, wherein
- the output mode includes at least one of a color conversion mode of converting a color of the original image data, a sharpness changing mode of changing sharpness of the original image data and a background removal amount changing mode of changing a background removal amount.

5. The image testing apparatus as claimed in claim 4, wherein
- in a case where the output mode is the color conversion mode, a testing target area extraction part is configured to extract, as testing target areas, a color area before the color is converted in the original image data and a corresponding color area in the output image data, and
- the testing item setting part is configured to set, as the testing item, an item as to whether the testing target area has changed in a direction of chromaticity designated by the user.

6. The image testing apparatus as claimed in claim 5, wherein
- in the case where the output mode is the color conversion mode, the testing part is configured to compare average values of brightness and color difference signals of the original image data and the output image data at the testing target areas, and determine test success in a case where chromaticity of the output image data has changed in a direction of chromaticity designated by the user by a predetermined amount or more from chromaticity of the original image data.

7. The image testing apparatus as claimed in claim 5, wherein
- in the case where the output mode is the color conversion mode, the testing part is configured to determine test success in a case where a color difference of a measurement value of a brightness and color difference signal of a patch which is output using a toner of a color to be obtained by the color conversion designated by the user, from a value of a brightness and color difference signal of the output image data at the testing target area, is equal to or less than a predetermined value.

8. The image testing apparatus as claimed in claim 4, wherein
- in the case where the output mode is the sharpness changing mode, a testing target area extraction part is configured to extract, as testing target areas, respective edge areas of the original image data and the output image data, and
- the testing item setting part is configured to set, as the testing item, densities or a density changing amount of the original image data and the output image data at the testing target areas.

9. The image testing apparatus as claimed in claim 8, wherein
- in the case where the output mode is the sharpness changing mode, and the user has made a setting of increasing or reducing the sharpness, the testing part is configured to determine test success in a case where a total of density values of the output image data at the testing target area is larger or smaller than a total of density values of the original image data at the testing target area.

10. The image testing apparatus as claimed in claim 9, wherein
- in the case where the output mode is the sharpness changing mode, and the user has made a setting of increasing or reducing the sharpness, the testing part is configured to determine test success in a case where a total of density values of the output image data at the testing target area is larger by a predetermined amount or more, or smaller by a predetermined amount or more, than a total of density values of the original image data at the testing target area.

11. The image testing apparatus as claimed in claim 4, wherein
- in the case where the output mode is the background removal amount changing mode, a testing target area extraction part is configured to extract, as testing target areas, areas regarded as background areas respectively in the original image data and the output image data, and
- the testing item setting part is configured to set, as the testing item, the numbers of pixels at the testing target areas.

12. The image testing apparatus as claimed in claim 11, wherein
- in the case where the output mode is the background removal amount changing mode, and the user has made a setting of increasing or reducing the background removal amount, the testing part is configured to determine test success in a case where the number of pixels at the area regarded as the background area in the output image data is increased or reduced from the number of pixels at the area regarded as the background area in the original image data.

13. The image testing apparatus as claimed in claim 1, wherein
in a case where the user has designated a mode of changing colors in the entirety of the output image data from the original image data, the testing part is configured to compare values of brightness and color balance signals between the original image data and the output image data, and determine whether a change in the output image data relative to the original image data has occurred in a direction designated by the user.

14. The image testing apparatus as claimed in claim 1, wherein
in a case where the user has made a setting of a mode of increasing or reducing densities in the entirety of the output image data from the original image data, the testing part is configured to determine test success in a case where $L^*$ values of the output image data are smaller by an amount, previously set, or more, or are larger by an amount, previously set, or more, from $L^*$ values of the original image data.

15. The image testing apparatus as claimed in claim 1, wherein
in a case where the user has designated a character mode as an image quality mode, the testing part is configured to determine test success in a case where densities at an edge area in the output image data are higher than those in the original image data, and a background removal amount level is larger in the output image data than that in the original image data.

16. The image testing apparatus as claimed in claim 1, wherein
in a case where the user has designated a photograph mode as an image quality mode, the testing part is configured to determine test success in a case where densities at an edge area in the output image data are lower than those of the original image data.

17. An image forming apparatus including the image testing apparatus claimed in claim 1.

18. A non-transitory computer readable information recording medium storing an image testing program for comparing output image data of an image which has been printed onto a recording medium by an external output apparatus and original image data which has been read from an original and is used to print the image onto the recording medium, and determining an output state of the image, the image testing program, when executed by one or plural processors, causing the one or plural processors to functions as:
an image reading part configured to generate the output image data based on the image printed image as read from the recording medium;
an output mode obtaining part configured to obtain, from a controller of the external output apparatus, an output mode designated by a user on the external output apparatus, in response to an obtaining request sent from the image testing apparatus to the controller of the external output apparatus, the output mode indicating requested changes with respect to image characteristics of the original image data;
a testing item setting part configured to set, according to the output mode obtained by the output mode obtaining part, an item for which the output state of the image is changed, as a testing item; and
a testing part configured to test, based on the requested changes indicated by the output mode, the output state of the image for the testing item which is set by the testing item setting part by,
detecting differences between the image characteristics of the output image data and image characteristics of the original data, and
determining, based on the detected differences, whether the output image data was changed relative to the original data in a manner that corresponds to the requested changes.

19. The image testing apparatus of claim 1, wherein the testing part is configured to determine, based on the detected differences, whether the output image data was changed relative to the original data in a manner that corresponds to the requested changes by,
determining whether or not the image characteristics of the testing item set by the testing item setting part have changed in a direction indicated by the requested changes,
determining a test success if the testing part determines the image characteristics of the testing item set by the testing item setting part have changed in a direction indicated by the requested changes, and
determining a test failure if the testing part determines the image characteristics of the testing item set by the testing item setting part have not changed in a direction indicated by the requested changes.

20. The non-transitory computer readable information recording medium of claim 18, wherein the image testing program, when executed the one or plural processors, causes the one or plural processors to function such that:
the testing part is configured to determine, based on the detected differences, whether the output image data was changed relative to the original data in a manner that corresponds to the requested changes by,
determining whether or not the image characteristics of the testing item set by the testing item setting part have changed in a direction indicated by the requested changes,
determining a test success if the testing part determines the image characteristics of the testing item set by the testing item setting part have changed in a direction indicated by the requested changes, and
determining a test failure if the testing part determines the image characteristics of the testing item set by the testing item setting part have not changed in a direction indicated by the requested changes.

* * * * *